United States Patent [19]

Chang

[11] 4,018,281

[45] Apr. 19, 1977

[54] OIL RECOVERY BY WATERFLOODING WITH IMPROVED MOBILITY CONTROL

[75] Inventor: Harry L. Chang, Dallas, Tex.

[73] Assignee: Mobil Oil Corporation, New York, N.Y.

[22] Filed: Nov. 7, 1974

[21] Appl. No.: 522,081

[52] U.S. Cl. .............................. 166/273; 166/252
[51] Int. Cl.² ....................................... E21B 43/25
[58] Field of Search ................... 166/252, 273, 274

[56] References Cited

UNITED STATES PATENTS

| | | | |
|---|---|---|---|
| 3,261,399 | 7/1966 | Coppel | 166/273 |
| 3,330,343 | 7/1967 | Tosch et al. | 166/274 |
| 3,330,344 | 7/1967 | Reisberg | 166/274 |
| 3,437,141 | 4/1969 | Brandner et al. | 166/273 |
| 3,467,187 | 9/1969 | Gogarty et al. | 166/273 |
| 3,557,872 | 1/1971 | Wood | 166/274 |
| 3,670,818 | 6/1972 | Knight | 166/274 |
| 3,670,819 | 6/1972 | Dauben et al. | 166/273 |

OTHER PUBLICATIONS

Slobod et al., "Use of a Gaded Viscosity Zone to Reduce Fingering in Miscible Phase Displacements", Producers Monthly, Aug. 1960, pp. 12–19.

Primary Examiner—Ernest R. Purser
Attorney, Agent, or Firm—C. A. Huggett; William D. Jackson

[57] ABSTRACT

Waterflooding employing the use of an initial mobility control slug which is graded at its front end by progressively increasing its viscosity and a terminal mobility control slug which is graded at its back end by progressively decreasing its viscosity. An intermediate mobility control slug of substantially constant viscosity may be injected between the initial and terminal slugs. The invention may be carried out in conjunction with surfactant or alkaline waterflooding.

16 Claims, 8 Drawing Figures

OIL RECOVERY BY WATERFLOODING WITH IMPROVED MOBILITY CONTROL

BACKGROUND OF THE INVENTION

This invention relates to the recovery of oil from subterranean oil reservoirs and more particularly to improved waterflooding operations involving the injection of mobility control slugs.

In the recovery of oil from oil-bearing reservoirs, it is usually possible to recover only minor portions of the original oil in place by the so-called primary recovery methods which utilize only the natural forces present in the reservoir. Thus a variety of supplemental recovery techniques have been employed in order to increase the recovery of oil from subterranean reservoirs. The most widely used supplemental recovery technique is waterflooding which involves the injection of water into an oil-bearing reservoir. As the water moves through the reservoir, it acts to displace oil therein to a production system composed of one or more wells through which the oil is recovered.

The injected aqueous medium employed in waterflooding may be simply field brine or surface water or it may contain various other materials. For example, the injected water may contain surface-active agents which reduce the interfacial tension between the injected water and oil or may contain various agents such as alkaline agents which react with injected or indigenous material in the reservoir oil to produce surface-active agents within the reservoir. The injected aqueous flooding medium may also comprise water and oil emulsions with the water being either the dispersed or continuous phase. For example, U.S. Pat. No. 3,261,399 to Coppel discloses a waterflooding process in which water-in-oil and oil-in-water emulsions are successively injected into the formation.

One difficulty often encountered in waterflooding operations is the relatively poor sweep efficiency of the aqueous displacing medium; that is, the injected displacing medium tends to channel through certain portions of the reservoir as it travels from the injection system to the production system and to bypass other portions. Such poor sweep efficiency or macroscopic displacement efficiency may be due to a number of factors such as differences in the mobilities of the injected displacing liquids and the displaced reservoir oil and permeability variations within the reservoir which encourage preferential flow through some portion of the reservoir at the expense of other portions.

Various techniques have been proposed in order to improve the sweep efficiency of the injected displacing medium and thus avoid premature breakthrough at one or more of the wells comprising the production system. The most widely used procedure involves the addition of thickening agents to the injected displacing medium in order to increase the viscosity thereof and thus decreasing its mobility to a value equal to or less than the mobility of the displaced reservoir oil, resulting in a "mobility ratio" of oil to water which is less than or equal to one. Mobility control by this procedure may be accomplished by employing a so-called "square" mobility control slug in which the concentration of the thickening agent is relatively constant throughout. Other procedures have involved the use of a so-called "graded" mobility control slug. For example, in a paper by W. R. Foster entitled "A Low Tension Waterflooding Process", JOURNAL OF PETROLEUM TECHNOLOGY, Vol. 25, February, 1973, pp. 205–210, there is disclosed a low tension waterflood process which involves the sequential injection of a protective slug, a surfactant slug, and a mobility control slug. The surfactant slug comprises an aqueous solution of petroleum sulfonates. The mobility control slug comprises water thickened with a viscosifier such as a water-soluble biopolymer in a graded decreasing concentration in order to provide an initial viscosity greater than the viscosity of the reservoir oil and a terminal viscosity near that of water. Thereafter, a driving fluid such as produced field brine is injected in order to carry the process to conclusion.

The aforementioned patent to Coppel also discloses the use of a graded viscosity mobility control slug injected in various sequences. For example, Coppel proposes following an oil-external emulsion with a first water-external emulsion and following this emulsion with a second water-external emulsion in which the viscosity is incrementally reduced to that of the subsequently injected driving water. Alternatively, Coppel suggests that the water-external emulsions may be replaced by an aqueous polymer slug in which the polymer concentration, and thus the slug viscosity, may be progressively reduced.

A paper by Mungan, N., "Programmed Mobility Control in Polymer Floods", The 3rd Symposium of the Assn. de Recherche sur les Techniques de Forage et de Production, Pau, France (June, 1968), presents a mobility control configuration designed to offset the limitations presented by adsorption of the polymer from the mobility control slug. The author notes that the polymer concentration decreases at the leading edge of the mobility control slug because of adsorption with the result that the aqueous medium moves ahead of the polymer. He further concludes that at the trailing edge of the slug little or no polymer adsorption takes place, thus causing an unfavorable mobility ratio between the polymer slug and the following water with the result that the water tends to miscibly finger through the polymer slug. To offset the effects of these adsorption phenomena, Mungan proposes to first inject a 4 percent slug of a 0.2 percent polymer solution and to follow this with a graded polymer slug in which the polymer concentration is decreased according to an exponential function.

SUMMARY OF THE INVENTION

In accordance with the present invention, there is provided a new and improved process for the recovery of oil from a subterranean oil reservoir involving the use of mobility control slugs which are graded at both the leading and trailing edges. In carrying out the invention, there is introduced into the reservoir via the injection system an initial mobility control slug which comprises an aqueous liquid, the viscosity of which is progressively increased as this slug is introduced into the reservoir. Subsequent to the injection of this slug, a terminal mobility control slug is injected into the reservoir. This terminal slug comprises an aqueous liquid in which the viscosity is progressively decreased as the terminal slug is injected. Preferably, the amount of the initial mobility control slug is within the range of 10 to 50 percent of the amount of the terminal mobility control slug.

In a further embodiment of the invention, an intermediate mobility control slug is injected into the reservoir so that it is located between the initial and terminal slugs. The viscosity of the intermediate slug is maintained substantially constant as this slug is injected. Preferably, the intermediate control slug is introduced in an amount no greater than the combined amounts of the graded initial and terminal slugs.

DESCRIPTION OF SPECIFIC EMBODIMENTS

As noted previously, mobility control in waterflooding operations is conventionally accomplished by addition of thickening agents to an injected aqueous medium in order to increase its viscosity or apparent viscosity as it flows through the reservoir. Various thickening agents which have been suggested for this purpose by the prior art, and which may be employed in carrying out the present invention, include such natural materials as guar gum or Karaya gum or such synthetic products as the ionic polysaccharide B-1459 produced by fermentation of glucose with the bacterium *Xanthomonas campestris* NRRL B-1459, USDA, and available from the Kelco Chemical Company under the trade name "Kelzan"; and poly(glucosylglucan)s such as disclosed in U.S. Pat. No. 3,372,749 to Williams and available from the Pillsbury Company under the trade name "Polytran". Other thickening agents which may be employed include carboxymethyl cellulose, hydroxyethyl cellulose, and the partially hydrolyzed polyacrylamides available from the Dow Chemical Company under the trade name of "Pusher Chemicals". While any thickening agent which is compatible with the injected water and with the reservoir involved may be employed in the invention, ionic polysaccharides such as Kelzan are preferred and the invention will be described with reference to the use of Kelzan as a thickening agent.

Figure 1:
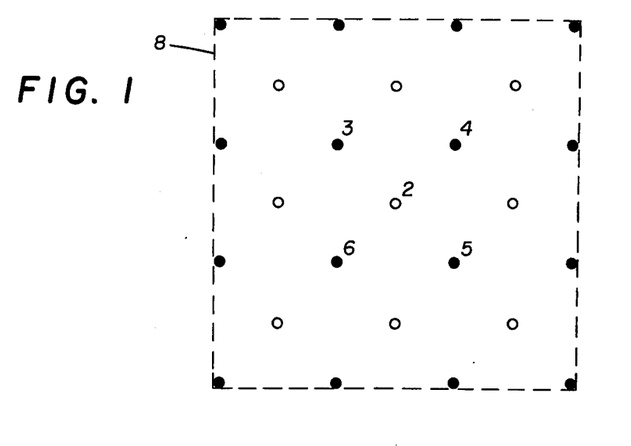
FIG. 1 is a plan view illustrating one type of well pattern which may be used in carrying out the present invention.

The present invention may be carried out utilizing injection and production systems as defined by any suitable arrangement of wells. One well arrangement commonly used in waterflooding operations and suitable for use in carrying out the present invention is an integrated five-spot pattern of the type illustrated in FIG. 1. In this Figure, the legend o is used to indicate a production well and the legend • is used to indicate an injection well. As shown in FIG. 1, this integrated pattern comprises a plurality of five-spot • o patterns, each of which comprises a central production well as indicated by reference character 2 and four peripheral injection wells as indicated by reference numerals 3, 4, 5, and 6. The term "pore volume", as used herein and in the appended claims to define the quantities of fluids injected in carrying out the invention, designates the pore volume of the formation underlying the well pattern defined by the wells comprising the injection and production systems. Thus the term "pore volume" as used with reference to the pattern shown in FIG. 1, is the pore volume of that portion of the formation underlying the area enclosed by broken line 8.

Of course, other well arrangements may be used in carrying out the present invention such as direct or staggered line drive patterns, four-spot, seven-spot, or nine-spot patterns, or circular flood patterns. For further description of these and other well arrangements which may be employed in waterflooding, reference is made to Calhoun, J. C., Jr., FUNDAMENTALS OF RESERVOIR ENGINEERING, Univ. of Oklahoma Press, Norman (1960), pp. 371–376, and Uren, L. C., PETROLEUM PRODUCTION ENGINEERING — OIL FIELD EXPLOITATION, McGraw-Hill Book Co., Inc., New York, Toronto, and London (1953), pp. 528–534. It is to be recognized also that the invention may be carried out utilizing dually completed injection-production wells of the type disclosed, for example, in U.S. Pat. No. 2,725,106 to Spearow. This arrangement may sometimes be utilized to advantage in relatively thick reservoirs in which it is desirable to displace the oil in the reservoir upwardly and recover the oil from the upper portion of the reservoir.

To demonstrate the results achieved by progressively increasing and decreasing the viscosity of mobility control slugs in accordance with the present invention, simulated five-spot displacement tests, described in greater detail hereinafter, were carried out in the laboratory. The simulated reservoir oil employed in these tests was formed by diluting a relatively viscous crude oil with a refined oil available from the Witco Chemical Company under the trade name "Klearol" to provide an oil exhibiting a viscosity at room temperature of about 196 centipoises.

Figure 2:
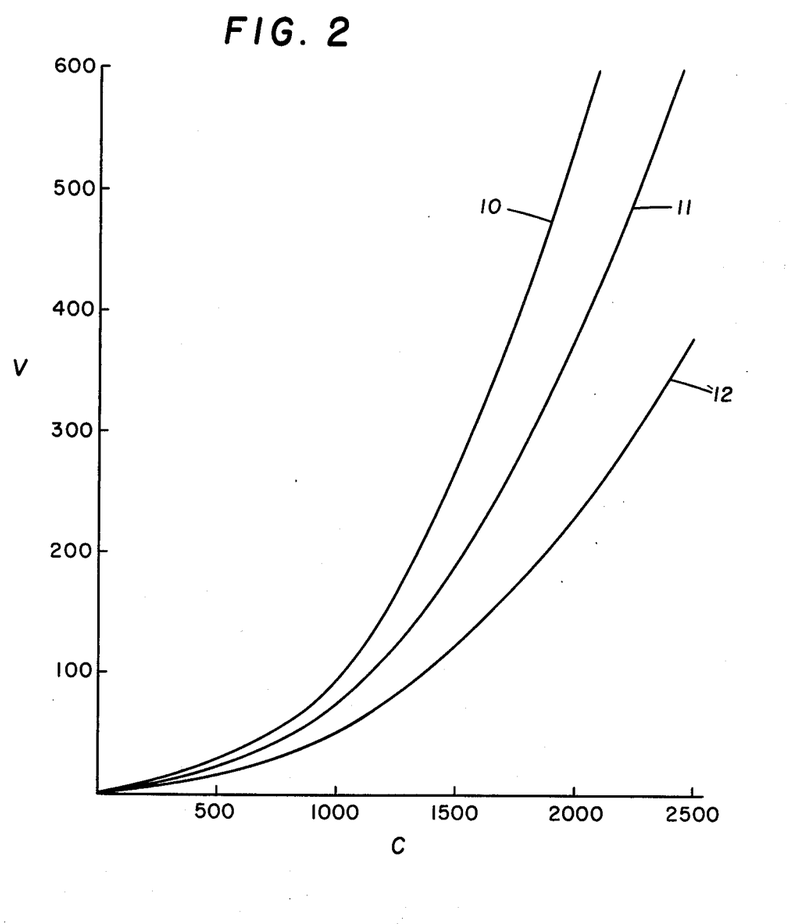
FIG. 2 is a graph illustrating the viscosity-concentration relationships of aqueous biopolymer dispersions.

The ionic polysaccharide Kelzan was employed as a thickening agent in the displacement tests. In each case, the viscosity of the aqueous Kelzan dispersion at maximum Kelzan concentration was greater than the viscosity of the simulated reservoir oil. FIG. 2 indicates the relationship between viscosity, V, in centipoises plotted on the ordinate and Kelzan concentration, C, in parts per million plotted on the abscissa for aqueous dispersions of Kelzan in substantially normal (pH of about 7.0–7.2) solutions of 0.5 percent by weight sodium chloride at 25° C. Curves 10, 11, and 12 indicate the viscosities as measured by a Brookfield viscosimeter at 0.3 rpm (0.37 sec$^{-1}$), 0.6 rpm (0.74 sec$^{-1}$), and 1.5 rpm (1.84 sec$^{-1}$), respectively. The viscosity enhancing effect of Kelzan may vary from one commercial batch to another and the curves in FIG. 2 are presented to give a qualitative representation of the effect of Kelzan concentration on viscosity. The viscosity normally will decrease somewhat with increasing temperature or at pH's significantly in excess of 7. Also curves 10, 11, and 12 indicate concentration-viscosity relationships for Kelzan dispersions one day old. The viscosity decreases somewhat as the Kelzan dispersion is aged. In addition the Kelzan dispersions would exhibit somewhat higher viscosities in sodium chloride concentrations significantly below or in excess of 0.5 weight percent.

Figure 3A:
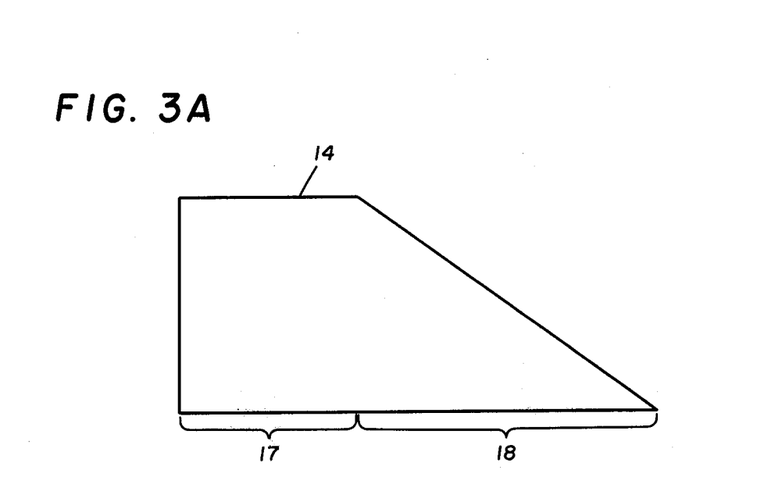
FIGS. 3A and 3B illustrate mobility control configurations employed in laboratory tests carried out with respect to the present invention.
Figure 3B:
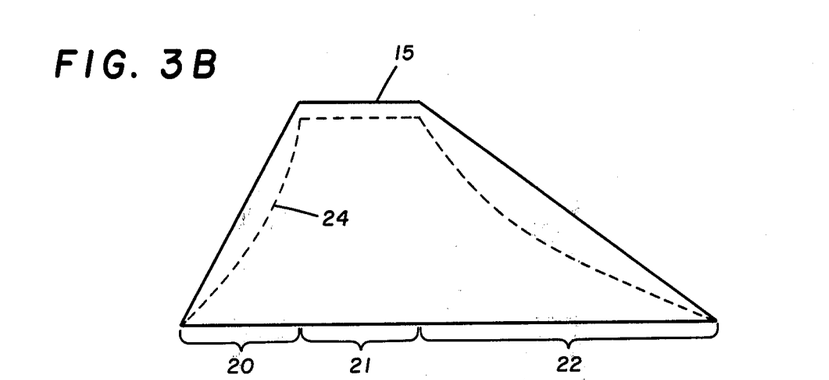

Turning now to FIGS. 3A and 3B, these Figures illustrate the basic mobility control configurations employed in the displacement tests. In FIGS. 3A and 3B, curves 14 and 15, respectively, show Kelzan concentration plotted on the ordinate versus the amount of injected fluid on the abscissa. Analogizing these Figures to the cross-section of a reservoir through which the mobility control fluid is injected, fluid movement would be from the right to the left.

The injection format shown in FIG. 3A is intended to simulate the prior art practice of injecting first a so-called "square" polymer slug indicated by bracket 17 followed by a graded polymer slug indicated by bracket 18. The injection schedule illustrated in FIG. 3B simulates the practice of the present invention involving the injection of an initial mobility control slug indicated by bracket 20 in which the Kelzan concentration is progressively increased to a maximum value followed by terminal mobility control slug indicated by bracket 22 in which the Kelzan concentration is progressively decreased from this maximum value down to zero. FIG. 3B also illustrates the embodiment of the invention in which an intermediate mobility control slug indicated by bracket 21 is injected in which the polymer concentration is maintained substantially constant.

As noted previously, curves 14 and 15 in FIGS. 3A and 3B illustrate the polymer concentration and in the tests described hereinafter the mobility control slugs will be characterized in terms of polymer concentration. It will be recalled that for Kelzan the solution viscosity varies exponentially with polymer concentration and in FIG. 3B the corresponding viscosity is indicated by broken line 24.

For other polymers the viscosity concentration relationships may be somewhat different. For example, data in the aforementioned paper by Mungan indicates that for the polymer identified as "Pusher 700", the viscosity increases linearly with polymer concentration at relatively low shear rates and nonlinearly, in an exponential function somewhat converse to that illustrated by broken line 24, at higher shear rates. In any case, the solution viscosity will vary directly with polymer concentration.

The simulated five-spot displacement tests were carried out in a visual flow cell comprising an outer transparent cylinder and a concentric inner sleeve which define an annulus. An inlet opening into the bottom of the annulus is employed as an injection point and a diametrically opposed outlet at the top of the annulus is employed as a production point. In each test, the cell was packed with unconsolidated sand and saturated with saline water with the amount of water necessary to saturate the sand being measured to determine the total pore volume of the cell. A simulated reservoir oil as described previously was then flooded into the cell until the effluent from the cell contained no water. The total amount of water displaced from the cell during this operation was measured in order to determine the initial oil saturation.

The displacement tests were carried out using an aqueous solution of 1 percent sodium chloride as the base flooding medium. In some cases, sodium hydroxide was added to the flooding medium in order to simulate an alkaline flood. In those tests where Kelzan was added to the flooding medium, it was added by means of a pump equipped with a stepping motor in order that the Kelzan concentration could be varied in such small increments as to continously change the concentration with the injection of the flooding medium or to maintain it constant as appropriate.

The results of nine displacement tests employing various mobility control configurations are summarized in Table I. In Table I the last column illustrates the mobility control configuration used for the respective tests in terms of the Kelzan concentration plotted on the ordinate as a function of the cumulative amount of fluid injected expressed as pore volumes plotted on the abscissa.

Referring to Table I, Run No. 1 summarizes the base case in which oil displacement was accomplished with a 1 percent aqueous solution of sodium chloride. The residual oil saturation at the conclusion of the run was 42.00 percent and the maximum oil recovery achieved was 46.4 percent. Run No. 2 represents a simulation of the prior art technique in which a square mobility control slug comprising an aqueous dispersion of Kelzan at an initial concentration of 2000 ppm was injected in an amount of 0.3 pore volume. Thereafter 0.45 pore volume of mobility control slug was injected with the Kelzan concentration decreased linearly from the maximum of 2000 ppm down to zero. The displacement test was then carried to completion by injecting 1 percent sodium chloride solution (without Kelzan) as a driving fluid until the total amount of fluid injected equalled 1.45 pore volumes.

TABLE I

| Run No. | $S_{oi}^1$ % | $S_{or}^2$ % | Oil Recovery % | WOR[3] | TFI[4] | Slug Additives | | | Mobility Control Configuration |
|---|---|---|---|---|---|---|---|---|---|
| | | | | | | NaCl % | NaOH N | Kelzan ppm-PV[5] | |
| 1 | 78.72 | 42.00 | 46.40 | 20 | 0.85 | 1.0 | 0 | 0 |  Conc.,ppm / Slug Size, PV |
| 2 | 78.99 | 28.13 | 64.40 | 20 | 1.45 | 1.0 | 0 | 1050 | 2000 / 0 .3 0.75 |
| 3 | 78.90 | 22.49 | 71.50 | 20 | 1.33 | 1.0 | 0 | 1050 |  2000 / 0 .2 .4 .85 |

TABLE I-continued

| Run No. | $S_{oi}$[1] % | $S_{or}$[2] % | Oil Recovery % | WOR[3] | TFI[4] | Slug Additives NaCl % | NaOH N | Kelzan ppm-PV[5] | Mobility Control Configuration |
|---|---|---|---|---|---|---|---|---|---|
| 4[6] | 77.05 | 35.66 | 53.70 | 2.0 | 0.81 | 1.0 | 0.05 | 1050 |  |
| 5 | 78.10 | 21.50 | 72.40 | 20 | 1.35 | 1.0 | 0.05 | 1050 |  |
| 6 | 78.69 | 19.86 | 74.80 | 20 | 1.15 | 1.0 | 0.05 | 1050 |  |
| 7 | 78.70 | 24.64 | 69.00 | 20 | 1.32 | 1.0 | 0.05 | 1050 |  |
| 8 | 79.26 | 14.70 | 81.50 | 20 | 1.52 | 1.0 | 0.05 | 1050 |  |
| 9[7] | 71.85 | 20.00 | 72.10 | 20 | 1.11 | 1.0 | 0.01 | 600 |  |

Footnotes for Table I
[1] $S_{oi}$ = Initial oil saturation.
[2] $S_{or}$ = Residual oil saturation at conclusion of test.
[3] WOR = Avg. water-oil ratio.
[4] TFI = Total fluid injected in pore volumes.
[5] ppm-PV = total amount of Kelzan expressed as ppm times pore volume.
[6] Experiment terminated early due to plugging.
[7] The cell used in this run was resaturated with oil after Run No. 1, without repacking with fresh sand.

Run No. 3 illustrates a mobility control configuration in accordance with the present invention. An initial mobility control slug in the amount of 0.2 pore volume was injected during which the Kelzan concentration was linearly increased from zero to a maximum of 2000 ppm. Thereafter an intermediate mobility control slug was injected in an amount of 0.2 pore volume, with the Kelzan concentration maintained constant at 2000 ppm. Subsequently, the terminal mobility control slug was injected in an amount of 0.45 pore volume with the Kelzan concentration graded linearly from 2000 to zero. The process was then carried to completion by the injection of a 1 percent sodium chloride solution without Kelzan until a total amount of 1.33 pore volumes of fluid was injected. Runs Nos. 4 and 6 were carried out following the mobility control configuration of Runs Nos. 2 and 3, respectively, but with the aqueous displacing fluid containing 0.05 normal sodium hydroxide in order to simulate an alkaline waterflooding process. Runs Nos. 5 and 9 employed a mobility control configuration somewhat similar to Run No. 4 except that an aqueous solution of sodium hydroxide without Kelzan was first injected in amounts of 0.1 and 0.5 pore volume, respectively. Thereafter the mobility control configuration was started with an initial "square" Kelzan slug and this was followed by a graded Kelzan slug. Runs Nos. 7 and 8 were carried out as alkaline floods with mobility control configurations similar to Runs Nos. 2 and 3, respectively, but with maximum Kelzan concentrations of 1500 ppm.

Figure 4A:
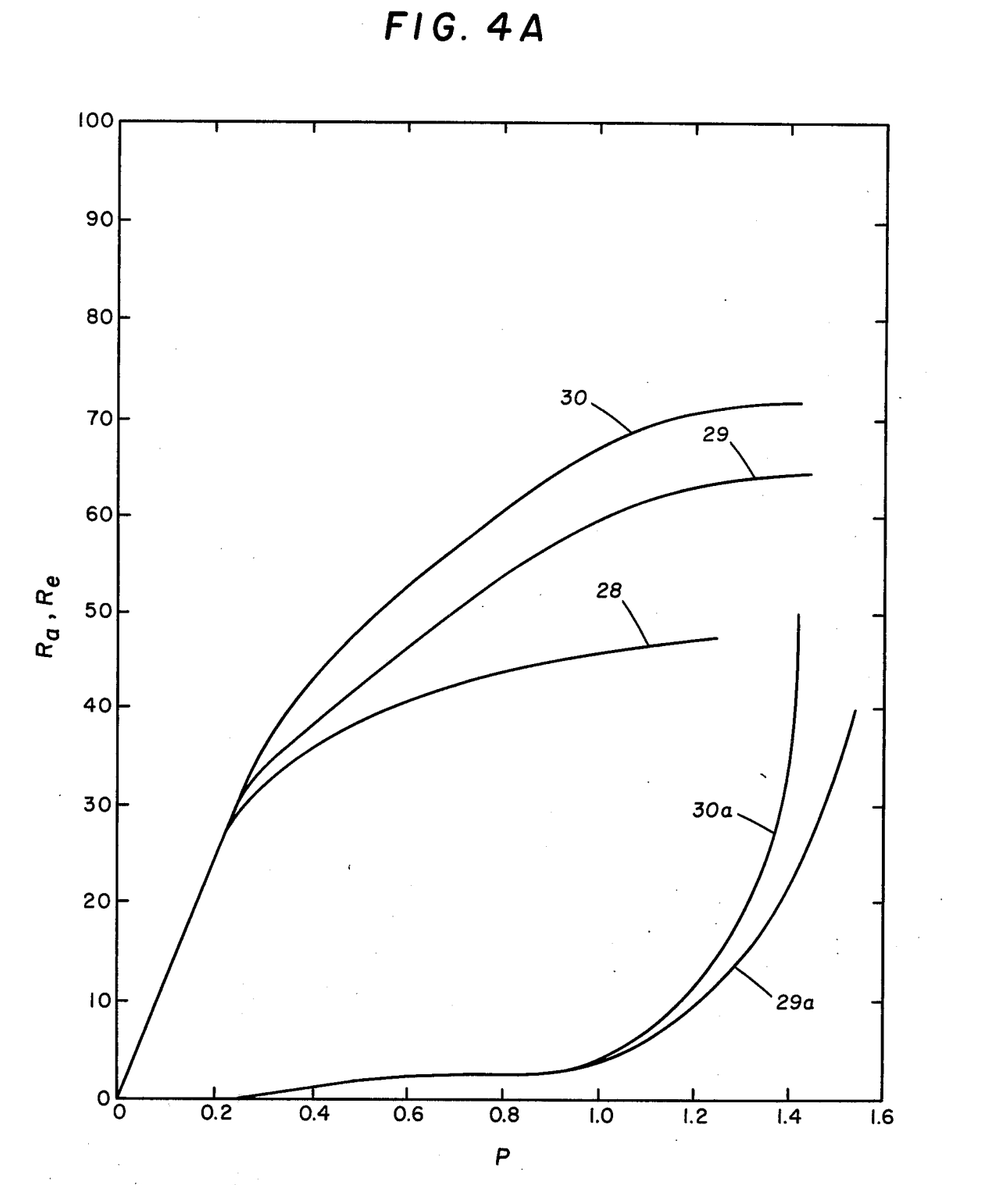
FIGS. 4A and 4B are graphs illustrating oil recoveries achieved in laboratory tests carried out employing mobility control configurations of the present invention as compared with mobility control configurations of the prior art.
Figure 4B:
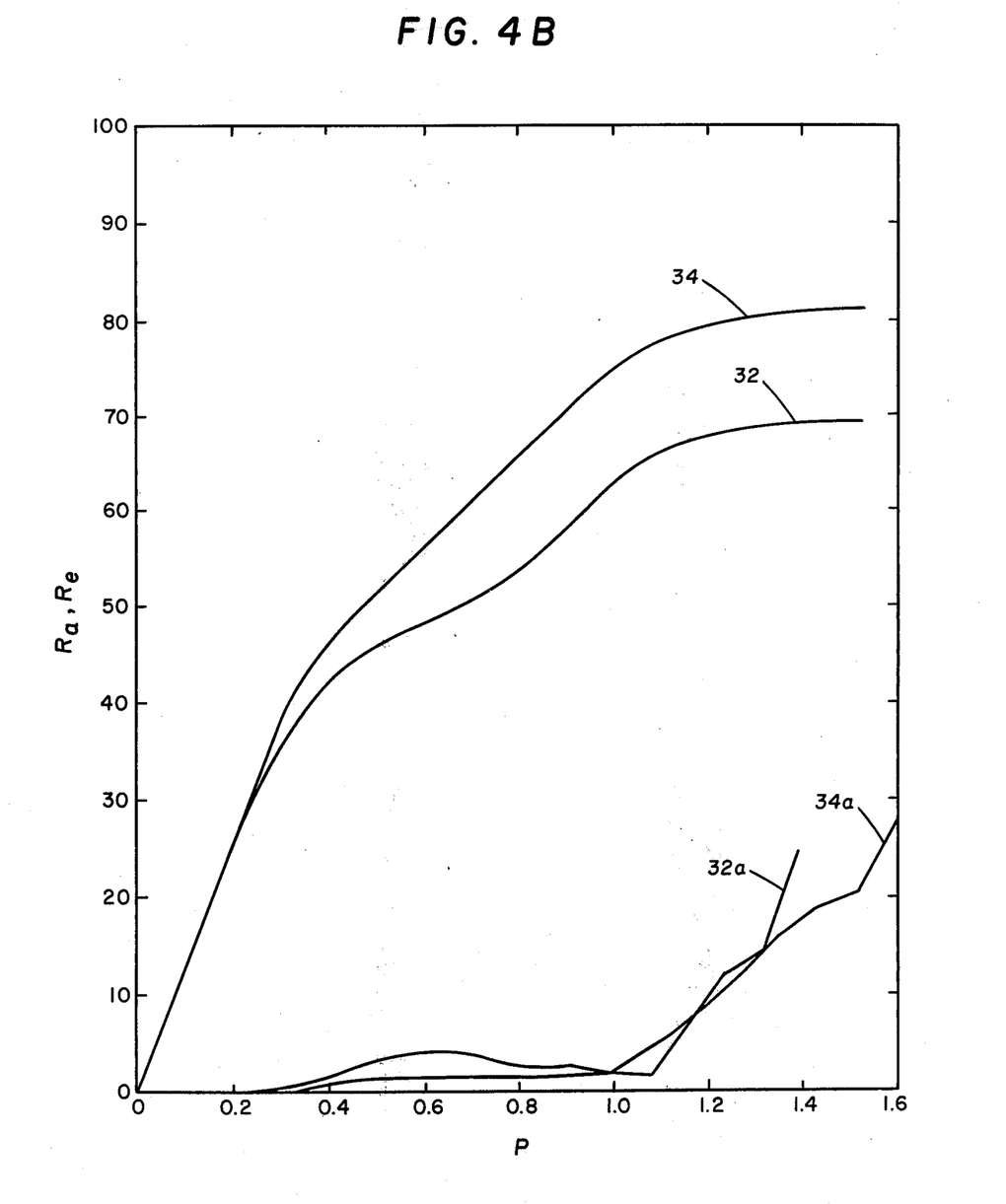

The results of certain of the tests summarized in Table I are illustrated graphically in FIGS. 4A and 4B which are plots of percent oil recovery, $R_e$, and produced water-oil ratio, $R_a$, on the ordinate versus the cumulative volumes of fluid produced, P, in pore volumes on the abscissa. Considering first FIG. 4A, curves 28, 29, and 30 indicate the percent oil recovery as a function of cumulative pore volumes of fluid produced for Runs Nos. 1, 2, and 3, respectively. Curves 29a and 30a indicate the produced water-oil ratio as a function of cumulative fluid production for Runs Nos. 2 and 3, respectively. As can be seen from examination of FIG. 4A, more oil is recovered by employing graded initial and terminal oil recovery slugs in accordance with the present invention than by a "square" mobility control slug with a graded terminal portion as suggested by the prior art. It will be noted that increased incremental oil recovery occurs initially at between about 0.2 to 0.3 pore volume of produced fluid.

Curves 32 and 34 of FIG. 4B indicate the results of Runs Nos. 7 and 8, respectively, with curves 32a and 34a indicating the water-oil ratios for these same respective runs. Upon examination of curves 32 and 34 it can be seen that again an incremental increase in percent oil recovery is obtained starting at between 0.2 and 0.3 pore volume of produced fluid when the invention is practiced in conjunction with an alkaline waterflood.

Figure 5A:
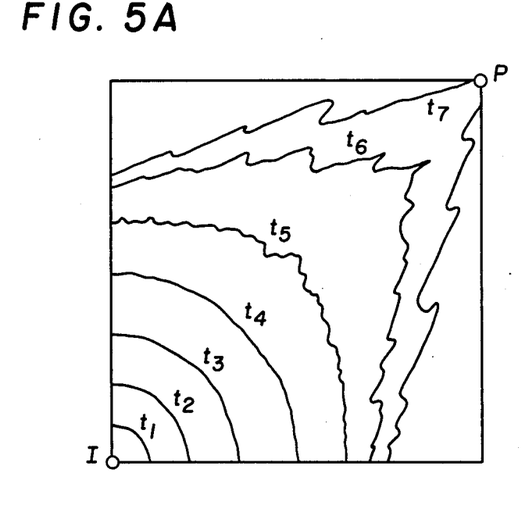
FIGS. 5A and 5B are schematic illustrations showing flood fronts achieved employing mobility control configurations of the present invention in comparison with mobility control configurations of the prior art.
Figure 5B:
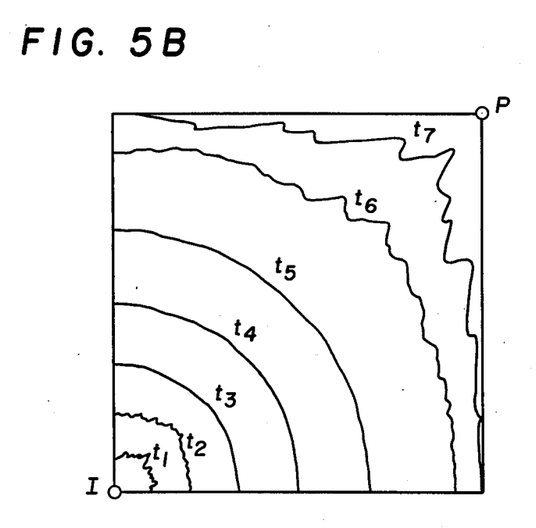

FIGS. 5A and 5B are schematic illustrations, based upon visual observations of the above described flow cell, of the flood fronts associated with the mobility control configurations shown in FIGS. 3A and 3B, respectively. Each of FIGS. 5A and 5B is a plan view of a quadrant of a five-spot pattern showing the flood front at successive time intervals $t_1$ through $t_7$ as it advances from an injection point I to a production point P. While the present invention is not to be limited by theory, it is believed that these Figures illustrate the comparative displacement mechanisms involved in the two mobility control configurations.

As shown in FIG. 5A the initially injected square mobility control slug at first forms a "superstable" flood front associated with a mobility ratio less than unity. This superstable condition is maintained for the successive times $t_1$ through $t_4$. As noted previously, the injected polymeric thickening agent is subject to adsorption upon the rock surfaces within the reservoir and thus moves through the reservoir by a chromatographic adsorption-desorption process. Since the rate of desorption is less than the rate of adsorption, the thickening agent is transported through the reservoir at a rate lower than that of the aqueous liquid in which it is dispersed.

In addition, and perhaps more importantly, the mobility control slug tends to mix with the reservoir water, resulting in a decrease in thickening agent concentration, and the subsequently injected driving fluid, because of its greater mobility, moves through the reservoir at a higher rate than the mobility control slug. Because of these factors, the flood front becomes progressively more unstable beginning at about time $t_5$ and tends to finger through the reservoir oil and move preferentially toward the production point.

In FIG. 5B the flood front is initially unstable because of the low polymer concentration resulting in a mobility ratio of greater than unity. However, this initial instability occurs near the injection point I. Starting at about time $t_3$ and continuing through time $t_5$ the flood front reaches a superstable condition. At time $t_6$ the flood front returns to an unstable condition and becomes progressively more unstable as the front moves through the remainder of the reservoir. However, the area, as shown in the drawing, swept by the flood front is greater in FIG. 5B than in FIG. 5A.

The sizes of the mobility control slugs employed in the present invention may vary depending upon the nature of the reservoir oil and formation. Preferably the initial and terminal mobility control slugs are injected in amounts within the ranges of 0.02–0.2 pore volume and 0.05–0.5 pore volume, respectively. It is also preferred that the concentration of thickening agent, and thus the viscosity, in the initial mobility control slug be graded more sharply than the terminal mobility control slug. Preferably the initial mobility control slug is injected in an amount within the range of 10 to 50 percent of the amount of the terminal mobility control slug.

The use of an intermediate mobility control slug, while optional, is desirable from the standpoint of maintaining a superstable flood front throughout a significant intermediate portion of the reservoir. The intermediate mobility control slug preferably is injected in an amount within the range of 0.05 to 0.3 pore volume and desirably will comprise no more than 50 percent of the total mobility control slugs injected. Stated otherwise, the intermediate slug preferably is injected in an amount no greater than the combined amounts of the initial and terminal mobility control slugs.

Subsequent to the injection of the terminal mobility control slug, a driving fluid is injected in order to displace the previously injected fluids through the formation. The driving fluid typically may be any water which is locally available and is not incompatible with the formation. The driving fluid is injected in such amount, normally within the range of 0.5 to 1.0 pore volume, as is necessary to carry the displacement process to completion.

The maximum viscosity of the aqueous mobility control medium normally should be within the range of 1 to 4 times the viscosity of the reservoir oil. In most cases when consideration is given to the economic constraint placed upon the maximum amount of thickening agent to be employed in the process, a maximum viscosity ratio of aqueous medium to reservoir oil of about 1.5 to about 2.5 yields the optimum displacement efficiency and is preferred.

As will be understood by those skilled in the art, the viscosity of the polymer solution as referred to herein is the viscosity at shear rates and at temperature conditions prevailing throughout most of the reservoir volume traversed by the displacing medium as it travels between the injection and production systems. The temperature will remain relatively constant throughout the reservoir. Because of the radial flow geometry associated with the flow of fluid to or from a well, the flow velocity, and thus the shear rate, are extremely high immediately adjacent the well and relatively low at more remote locations in the reservoir. Typically the shear rate in the intermediate portion of the reservoir between the injection and production wells will be on the order of one $sec^{-1}$.

The initial and terminal mobility control slugs may be graded linearly or nonlinearly and the grading may be accomplished by constantly increasing or decreasing the polymer concentration, as the case may be, or by changing the polymer concentration by increments. While a continuous type of grading format was employed in the laboratory tests described previously, in most actual field operations, economics and equipment limitations will require that grading be accomplished in increments. For example, in the case of Kelzan, the polymer concentration in the initial mobility control slug may be increased progressively from zero to the desired maximum value in increments of 50 to 100 ppm. Typically, 5 to perhaps 20 increments may be employed in progressively increasing the viscosity of the initial slug and decreasing the viscosity of the terminal mobility control slug.

The invention may be practiced in conjunction with a low tension waterflooding process and in most applications this will be preferred. In this case an agent effective to reduce the interfacial tension between the injected aqueous medium and the reservoir oil is added to the aqueous medium at the same time as or prior to the injection of the initial mobility control slug. In any case the interfacial tension reduction agent normally will be first injected prior to the injection of the terminal mobility control slug and prior also to the injection of the intermediate mobility control slug if this embodiment of the invention is employed. The interfacial tension reduction agent may take the form of a surfactant composition such as disclosed in the aforementioned paper by Foster, or it may take the form of an alkaline agent such as sodium hydroxide which reacts with organic acids within the reservoir oil to form surface-active agents in situ.

In employing a petroleum sulfonate surfactant composition, it will usually be desirable to employ the petroleum sulfonates in a concentration within the range of 1 to 3 weight percent and to adjust the monovalent salt salinity of the sulfonate solution to a concentration within the range of 1 to 2 weight percent. In this respect, it usually will be preferred to first inject 0.05 to 0.2 pore volume of an aqueous solution of petroleum sulfonates without a polymeric thickening agent. Thereafter, the initial progressively graded mobility control slug is injected in accordance with the present invention. This initial mobility control slug also normally will contain petroleum sulfonates in a concentration within the range of 1 to 3 weight percent. The subsequently injected intermediate and terminal mobility control slugs normally will not contain petroleum sulfonates.

Various other surfactant formulations, either ionic or nonionic, may also be used in conjunction with the present invention. For example, water-soluble monovalent metal salts of long chained organic acids or nonionic compounds such as polyethoxylated alkyl phenols may be employed.

In the case of alkaline waterflooding, an initial slug of alkaline agent (without thickening agent) may be injected in an amount of 0.05 to 0.3 pore volume. The alkaline agent preferably is injected in the initial mobility control slug and usually will be present within the intermediate slug and may be in the terminal mobility control slug also. The alkaline agent normally will be added in a concentration to adjust the pH to a value within a range of 11.5 to 13. Sodium hydroxide is preferred as the alkaline agent although other alkali metal or ammonium hydroxides or carbonates may be employed. When employing sodium hydroxide it should be present in an amount within the range of 0.005 to 0.1 N in order to provide a pH within the aforementioned range. For alkaline waterflooding the salinity of the injected medium preferably is adjusted to provide a monovalent salt salinity within the range of 0.5 to 2.0 percent by weight. The salinity normally will be controlled by the addition of sodium chloride; however, salinity control can be accomplished by means of other monovalent salts, particularly the alkali metal halides such as potassium chloride.

I claim:
1. In the recovery of oil from a subterranean oil reservoir penetrated by spaced injection and production systems, the method comprising:
 a. introducing into said reservoir via said injection system an initial mobility control slug comprising an aqueous liquid having a predominant continuous aqueous phase the viscosity of which is progressively increased as said initial slug is introduced into said reservoir,
 b. subsequent to step (a) introducing into said reservoir via said injection system a terminal mobility control slug comprising an aqueous liquid having a predominant continuous aqueous phase the viscosity of which is progressively decreased as said terminal slug is introduced into said reservoir, and
 c. recovering oil from said production system.
2. The method of claim 1 wherein the amount of said initial mobility control slug is within the range of 10–50 percent of the amount of said terminal mobility control slug and the viscosity of said initial mobility control slug is increased more sharply than the viscosity of said terminal mobility control slug is decreased.
3. The method of claim 1 wherein said initial and terminal mobility control slugs are injected in amounts within the ranges of 0.02–0.2 pore volume and 0.05–0.5 pore volume, respectively.
4. The method of claim 1 further comprising the step of subsequent to step (a) and prior to step (b) introducing into said reservoir via said injection system an intermediate mobility control slug comprising an aqueous liquid having a continuous aqueous phase the viscosity of which is maintained substantially constant as said intermediate mobility control slug is introduced into said reservoir.
5. The method of claim 4 wherein said intermediate mobility control slug is introduced in an amount no greater than the combined amounts of said initial and terminal mobility control slugs.
6. The method of claim 1 further comprising the step of prior to step (b) introducing into said reservoir a low tension slug comprising an aqueous liquid having a continuous aqueous phase and containing an agent effective to reduce the interfacial tension between said aqueous liquid and said reservoir oil.
7. In the recovery of oil from a subterranean oil reservoir penetrated by spaced injection and production systems, the method comprising:
 a. introducing into said reservoir via said injection system an initial mobility control slug comprising an aqueous liquid containing a thickening agent wherein the concentration of said thickening agent is progressively increased as said initial slug is introduced into said reservoir from a value imparting a viscosity less than that of the viscosity of the reservoir oil to a value imparting a viscosity at least as great as the viscosity of said reservoir oil,
 b. subsequent to step (a) introducing into said reservoir via said injection system a terminal mobility control slug comprising an aqueous liquid containing a thickening agent wherein the concentration of said thickening agent is progressively decreased as said terminal slug is introduced into said reservoir from a value imparting a viscosity at least as great as the viscosity of the reservoir oil to a value imparting a viscosity less than the viscosity of said reservoir oil, and
 c. recovering oil from said production system.

8. The method of claim 7 wherein the concentration of thickening agent in said initial mobility control slug is graded more sharply than in said terminal mobility control slug.

9. The method of claim 7 wherein the amount of said initial mobility control slug is within the range of 10–50 percent of the amount of said terminal mobility control slug.

10. The method of claim 7 wherein said initial and terminal mobility control slugs are injected in amounts within the ranges of 0.02–0.2 pore volume and 0.05–0.5 pore volume, respectively.

11. The method of claim 7 further comprising the step of subsequent to step (a) and prior to step (b) introducing into said reservoir via said injection system an intermediate mobility control slug comprising an aqueous liquid containing a thickening agent wherein the concentration of said thickening agent is maintained substantially constant as said intermediate mobility control slug is introduced into the reservoir.

12. The method of claim 11 wherein said intermediate mobility control slug is introduced in an amount no greater than the combined amounts of said initial and terminal mobility control slugs.

13. The method of claim 11 wherein said intermediate mobility control slug is injected in an amount within the range of 0.05–0.3 pore volume.

14. The method of claim 7 further comprising the step of prior to step (b) introducing into said reservoir a low tension slug comprising an aqueous medium containing an agent effective to reduce the interfacial tension between said aqueous medium and said reservoir oil.

15. The method of claim 14 wherein said agent comprises a surfactant.

16. The method of claim 14 wherein said agent comprises an alkaline agent which reacts with organic acids within said reservoir to produce surfactants.

* * * * *